(12) United States Patent
Lipson et al.

(10) Patent No.: US 11,256,112 B2
(45) Date of Patent: Feb. 22, 2022

(54) ELECTRO-REFRACTIVE MODULATION IN PHOTONIC STRUCTURES

(71) Applicant: The Trustees of Columbia University in the City of New York, New York, NY (US)

(72) Inventors: Michal Lipson, New York, NY (US); James Hone, New York, NY (US); Nanfang Yu, Fort Lee, NJ (US); Ipshita Datta, New York, NY (US); Sanghoon Chae, New York, NY (US); Gaurang R Bhatt, New York, NY (US); Dmitri N Basov, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 254 days.

(21) Appl. No.: 16/282,013

(22) Filed: Feb. 21, 2019

(65) Prior Publication Data

US 2019/0258088 A1 Aug. 22, 2019

Related U.S. Application Data

(60) Provisional application No. 62/633,542, filed on Feb. 21, 2018.

(51) Int. Cl.
*G02F 1/01* (2006.01)

(52) U.S. Cl.
CPC ........ *G02F 1/0102* (2013.01); *G02F 2203/11* (2013.01); *G02F 2203/50* (2013.01)

(58) Field of Classification Search
CPC .............. G02F 1/0102; G02F 2203/50; G02F 2203/11; G02F 1/01
See application file for complete search history.

(56) References Cited

U.S. PATENT DOCUMENTS

2020/0057354 A1* 2/2020 Cao .................... G02F 1/313

OTHER PUBLICATIONS

Chernikov et al., "Population inversion and giant bandgap renormalization in atomically thin $WS_2$ layers", Nat. Photonics, 2015, 9, 466-470.

Ferrari et al., "Science and technology roadmap for graphene, related two-dimensional crystals, and hybrid systems", Nanoscale, 2015, 7, 4598-4810.

Harris et al., "Efficient, compact and low loss thermos-optic phase shifter in silicon", Optics Express, May 2014, vol. 22, No. 9, 10487-10493.

(Continued)

*Primary Examiner* — Joseph P Martinez
(74) *Attorney, Agent, or Firm* — BakerHostetler

(57) ABSTRACT

Methods, systems, and devices are described for electro-optic tuning. An example device may comprise a first layer comprising a transition metal di-chalcogenide material, a second layer comprising a conductive material, and a third layer comprising a dielectric material. The third layer may be disposed at least partially between the first layer and the second layer. An electrical potential difference applied between the first layer and the second layer may cause a tunable refractive index change in the first layer.

18 Claims, 13 Drawing Sheets

(56) References Cited

OTHER PUBLICATIONS

He et al., "Tightly bound excitons in monolayer $WSe_2$", Phys. Rev. Lett., 2014, 113, 026803, 19 pages.
Li et al., "Measurement of the optical dielectric function of monolayer transition-metal dichalcogenides: MoS2, MoSe2, WS2, and WSe2", Phys. Rev. B, 2014, 90, 205422-1-205422-6.
Reed et al., "Silicon optical modulators", Nature Photonics, 2010, 4, 518-526.
Steinhoff et al. "Influence of excited carriers on the optical and electronic properties of MoS2", Nano Lett., 2014, 14, 3743-3748.
Wang et al., "Nanophotonic Lithium Niobate Electro-optic Modulators", Optics Express, Jan. 2018, vol. 26, Issue 2, 1547-1555.
Wooten et al., "A Review of Lithium Niobate Modulators for Fiber-Optic Communications Systems", IEEE Journal of Selected Topics in Quantum Electronics, Jan./Feb. 2000, vol. 6, No. 1, 69-82.

\* cited by examiner

ELECTRO-REFRACTIVE MODULATION IN PHOTONIC STRUCTURES

CROSS-REFERENCE TO RELATED APPLICATIONS

This application claims the benefit of U.S. Provisional Patent Application No. 62/633,542 filed Feb. 21, 2018, which is hereby incorporated by reference in its entirety for any and all purposes.

GOVERNMENT SUPPORT CLAUSE

This invention was made with government support under DE-SC0019443 awarded by the U.S. Department of Energy. The government has certain rights in the invention.

BACKGROUND

Conventional phase shifters and other similar electro-optic devices exist but suffer from a variety of drawbacks. Plasma dispersion effect based silicon modulators are used but suffer from loss accompanied with injection of carriers. Lithium Niobate based Electro-optic modulators suffer from low refractive index change and are difficult to integrate with silicon platforms. Phase modulators based on thermo-optic effect suffer from high electrical power consumption (milliWatts) and low refractive index change. Thus, there is a need for more sophisticated phase shifters and other similar electro-optic devices.

SUMMARY

Methods, systems, and devices are described for electro-optic tuning. An example device may comprise a first layer comprising a transition metal di-chalcogenide material, a second layer comprising a conductive material, and a third layer comprising a dielectric material. The third layer may be disposed at least partially between the first layer and the second layer. An electrical potential difference applied between the first layer and the second layer may cause a tunable refractive index change in the first layer.

An example method may comprise receiving a signal, and applying, based on the signal, an electrical potential difference between a first layer and a second layer to cause a tunable refractive index change in the first layer. The first layer may comprise a transition metal di-chalcogenide material and the second layer may comprise a conductive material. A third layer comprising a dielectric material may be disposed at least partially between the first layer and the second layer.

Another example device may comprise a component comprising a first layer and a second layer. The first layer may comprise a monolayer transition metal di-chalcogenide material. The device may comprise a logic unit configured to cause an electrical potential difference between the first layer and the second layer to cause a tunable refractive index change in one or more of the first layer or the second layer.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

The disclosed subject matter provides systems and methods for developing integrated phase shifters and other photonic devices using monolayer 2D Transition Metal Di-chalcogenides (TMD's—WS2, WSe2, MoS2, MoSe2, etc.) for near-infrared wavelengths.

In accordance with one embodiment, the disclosed subject matter provides a phase shifter for improved refractive index change, electrical power consumption, and optical loss. The phase shifter can be designed based on the excitonic strength of monolayer TMD's. For example, the phase shifter can have index change of about 13% while its loss can be tuned by less than about 0.2% (e.g., or less than about 0.15%, about 0.25%, about 0.30%) at about 1550 nm wavelength (less than about 0.012 dB/cm/V).

In certain embodiments, the TMD can have sharp excitonic resonance centered around 2 eV. The excitonic resonance can be linked to the exciton binding energy, which can be tuned by introducing charge carriers into the TMD material. In the near-infrared region, despite being well detuned from the TMD's excitonic resonance, the refractive index can be subject to change with modifications in the excitonic binding energy, while absorption can be minimal.

Figure 1:
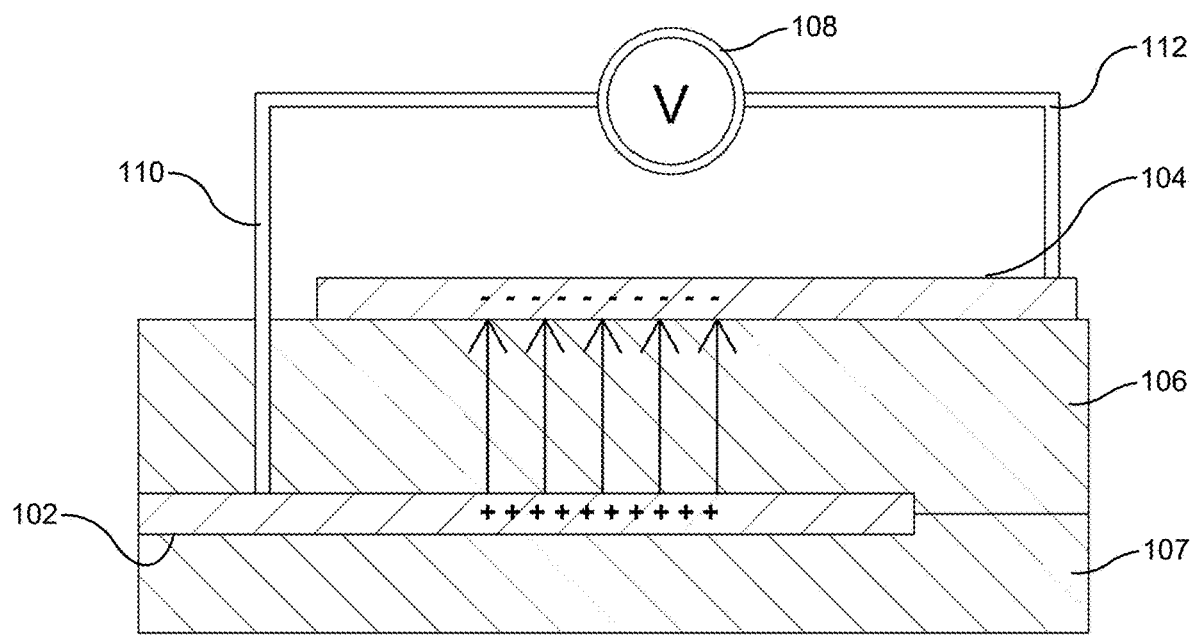
FIG. 1 is a diagram showing an example device in accordance with the present disclosure.

In certain embodiments, charges can be introduced in the TMD layer by using it in a parallel plate capacitor configuration with $HfO_2$ as the dielectric and transparent conductor (indium tin oxide (ITO)) as the other contact as seen in FIG. 1. In a parallel plate capacitor, a potential can be applied across the two parallel plates (e.g., TMD and ITO), thereby introducing/depleting electrons in $WS_2$/ITO. This can cause a shift in the excitonic resonance, the effect of which can be felt at near IR wavelengths (e.g., 0.8 eV).

In certain embodiments, refractive index of monolayer $WS_2$, a TMD material, can be tuned with dielectric permittivity on the order of 30 in the near-infrared (NIR). For example, in the NIR range (e.g., about 1530-about 1560 nm), despite being well detuned from $WS_2$ excitonic resonance centered around 2 eV (nm), the refractive index can be dominated by the excitonic resonance, while absorption can be minimal.

Figure 2C:
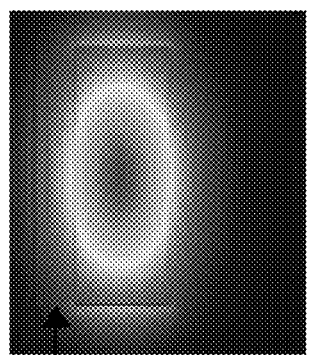
FIG. 2C is a diagram showing the position of the first layer in the mode-profile of the waveguide configuration.
Figure 2B:
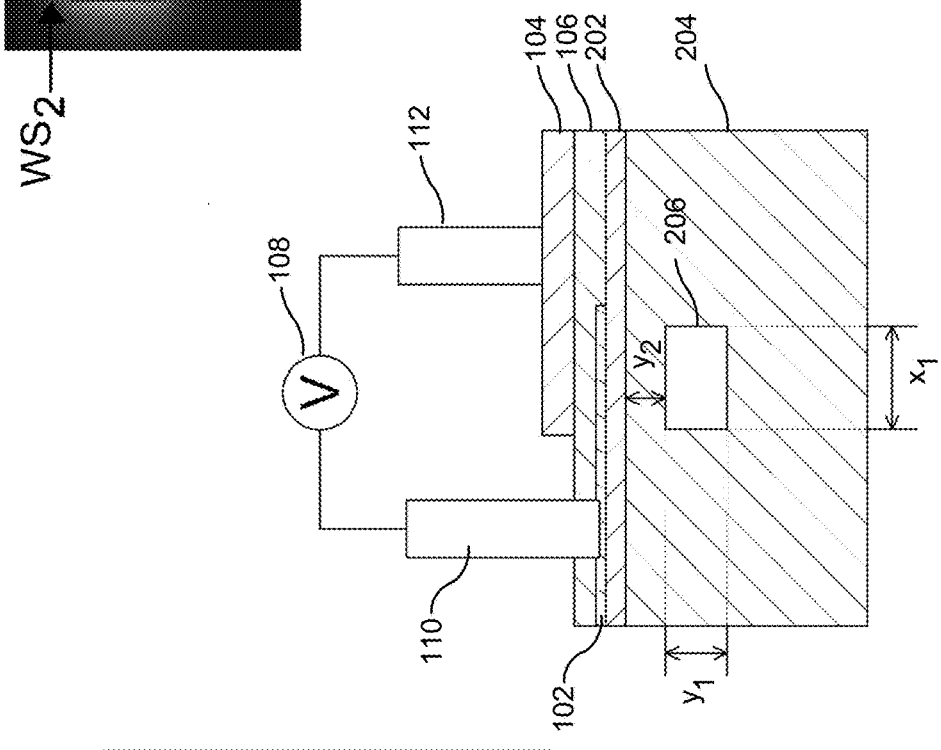
FIG. 2B shows a cross-sectional view of the example fabricated device.
Figure 2A:
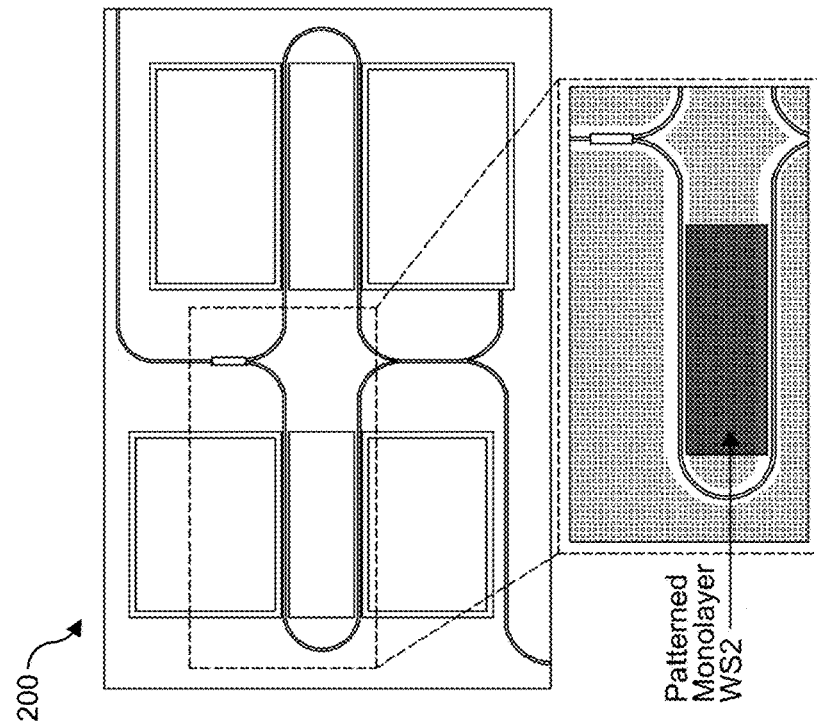
FIG. 2A is a diagram showing an optical micrograph of an example fabricated device.
Figure 3A:
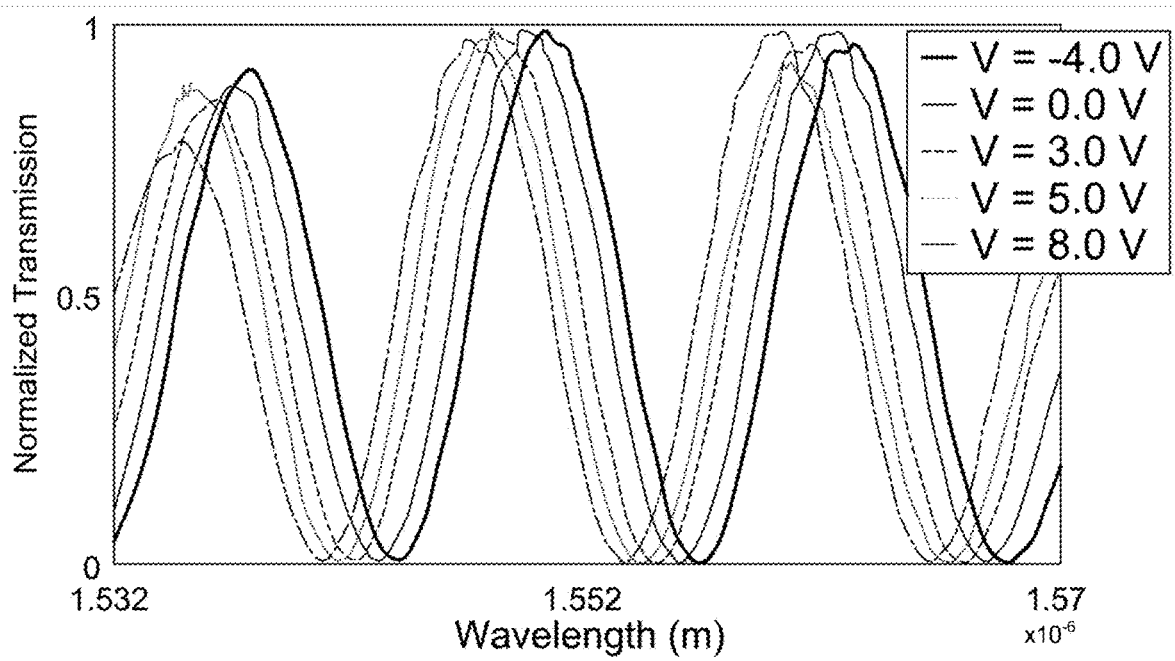
FIG. 3A is a graph showing transmission response of the example fabricated device.
Figure 3B:
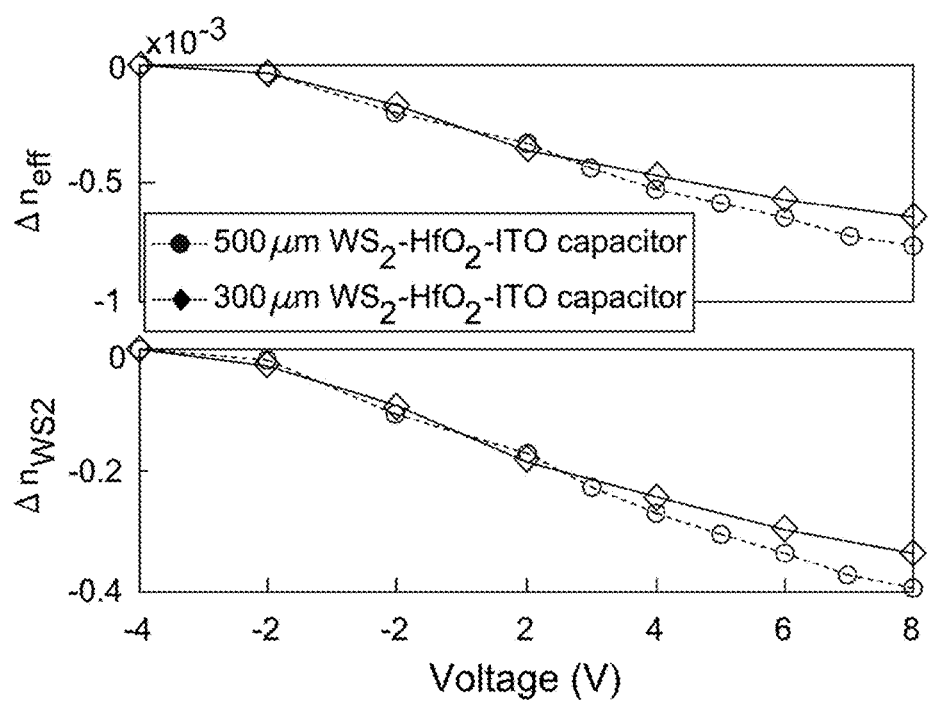
FIG. 3B shows graphs illustrating change in effective index of mode and index of $WS_2$.

In certain embodiments, an electrically tunable monolayer $WS_2$ can be integrated on a SiN photonic structure by embedding a thin 26 nm $HfO_2$ dielectric between $WS_2$ and ITO layer (e.g., as shown in FIG. 2B). FIG. 2A shows the location of the patterned 2D TMDC on the left arm of the MZI (dashed inset,). The capacitor can be designed to electrically dope the monolayer, with an electron density of about $1 \times 10^{13}$ cm$^{-2}$. Furthermore, a refractive index change of about 13% can be achieved in the disclosed monolayer $WS_2$ (as shown in FIG. 3B).

In certain embodiments, a Mach Zehnder Interferometer (MZI) and/or MZI modulator composed of silicon nitride (SiN) waveguides can be fabricated to measure the electrical tuning of the $WS_2$ refractive index. As shown in FIG. 3A, the MZI transmission spectra for different bias voltages can be applied across the capacitor. The extracted change in effective index of the mode for wavelengths from about 1530 to about 1560 nm is shown in FIG. 3B. From the modal overlap in FIG. 2B, FIG. 3B shows the change in index of $WS_2$. The observed index change of 13% in the $WS_2$ layer is the highest reported for an electrically tunable dielectric material. As shown in FIG. 3D, the leakage current in the $WS_2$-$HfO_2$-ITO capacitors can be in nanoamps, thereby making these devices power efficient. Due to the capacitive nature of these devices, the DC power consumption can be in nanoWatts, which is much smaller than thermal or plasma dispersion modulators. Furthermore, by engineering devices with improved modal overlap between $WS_2$ and the photonic mode. The disclosed optical phase shifters can be integral to optical networks, phased arrays, optical delay lines and other optical signal processing applications. Accordingly, the disclosed subject matter provides can provide novel photonic functionalities on novel composite TMD/photonic waveguides.

FIG. 1 is a diagram showing an example device 100 in accordance with the present disclosure. The device 100 may comprise a first layer 102. The device 100 may comprise a second layer 104. The device 100 may comprise a third layer 106. The third layer 106 may be disposed adjacent to the first layer 102 and/or the second layer 104. The first layer 102 may be disposed adjacent to 102 the second layer 104. The device 100 may comprise a fourth layer 107. The fourth layer 107 may be disposed adjacent (e.g., below, in contact with) the first layer 102. The fourth layer 107 may comprise a substrate layer.

As used herein, the term "adjacent" means in contact or proximate to. A layer that is adjacent to another layer may have one or more intervening layers separating the layers. A layer that is adjacent another layer may be above (e.g., where a substrate or other initial layer is considered a bottom layer) or below the other layer. A layer that is adjacent another layer may have a side that is in contact with the other layer. The third layer 106 may be disposed at least partially between the first layer 104 and the second layer 106. The first layer 102 may be above the second layer 104 and/or the third layer 106. The third layer 106 may be disposed above the second layer 104.

The device 100 may be formed using a variety of materials. The first layer 102 may comprise a transition metal, a semiconductor, a combination thereof, and/or the like. The first layer 102 may comprise a doped layer, such as a n-type doped layer or a p-type doped layer. The first layer 102 may comprise a two-dimensional layer, a monolayer, or a combination thereof. The thickness of the first layer 102 may be only one molecule thick. The first layer 102 may comprise a chalcogen (e.g., any element group 16 of the periodic table), di-chalcogen, and/or the like. The first layer 102 may comprise a transition metal.

The first layer 102 may comprise a transition metal di-chalcogenide material. The first layer 102 may comprise a n-type doped transition metal di-chalcogenide material or a p-type doped transition metal di-chalcogenide material. The transition metal di-chalcogenide material may comprise a two-dimensional (e.g., having a thickness of one molecule and/or only a few atoms) transition metal di-chalcogenide material. The transition metal di-chalcogenide material may comprise a monolayer transition metal di-chalcogenide material. The transition metal di-chalcogenides material may comprise tungsten, molybdenum, sulfur, selenium, a combination thereof, and/or the like. The transition metal di-chalcogenide material may comprise tungsten disulfide ($WS_2$), tungsten diselenide ($WSe_2$), molybdenum disulfide ($MoS_2$), Molybdenum diselenide ($MoSe_2$), a combination thereof, and/or the like.

The second layer 104 may comprise a conductive material. The conductive material may comprise a metal, a conductive oxide, a combination thereof, and/or the like. The conductive material may comprise indium, tin, a combination thereof, and/or the like. The conductive material may comprise indium tin oxide. The third layer 106 may comprise a dielectric material. The dielectric material may comprise hafnium, an oxide, a combination thereof, and/or the like. The dielectric material may comprise hafnium oxide.

The device 100 may be disposed in a capacitor configuration. The first layer 102, the second layer 104, the third layer 106, a combination thereof, and/or the like may be disposed in one or more of a capacitor configuration, such as a parallel plate capacitor configuration. The first layer 102 may be substantially parallel to the second layer 104 and/or the third layer 106. The first layer 102 and/or the second layer 104 may be configured to be coupled to an energy source 108 (e.g., voltage source, electrical supply). The device 102 may comprise a first electrode 110. The first electrode 110 may electrically couple the first layer 102 to the energy source 108. The first electrode 110 may be disposed at least partially adjacent to the first layer 102. The device 100 may comprise a second electrode 112. The second electrode 112 may electrically couple the second layer 104 to the energy source 108. The second electrode 112 may be disposed at least partially adjacent to the second layer 104.

Applying the energy source to the first layer 102 and/or the second layer 104 may cause negative and/or positive charges to accumulate. Negative charge may accumulate at the first layer 102 and positive charge may accumulate at the second layer 104, or vice versa. An electrical potential difference (e.g., or other energy difference) applied between the first layer 102 and the second layer 104 may cause a change in an optical property of the first layer 102, the second layer 104, the third layer 106, or a combination thereof. The change in the optical property may be tunable (e.g., by varying the electrical potential difference).

An electrical potential difference applied between the first layer 102 and the second layer 104 may cause a refractive index change (e.g., in the first layer 104). The refractive index change may be a tunable refractive index change. The refractive index change may be tuned based on a change in the electrical potential difference (e.g., or other energy metric, voltage, etc). The refractive index change may cause the change in the optical property of the first layer 102, the second layer 104, the third layer 106, or a combination thereof. The refractive index change may cause a phase shift. The phase change may be and/or be caused in a near-infrared range. The refractive index change may be greater than a threshold required for using the device 102 as a photonic device (e.g., optical phase shifter, optical modulator). The refractive index change may be (i) greater than about 5 percent, (ii) greater than about 10 percent, (iii) in a range of about 5 percent to about 15 percent, (iv) in a range of about 10 percent to about 15 percent, (iv) in a range of about 10 percent to about 20 percent, (iv) in a range of about 10 percent to about 25 percent, (iv) in a range of about 10 percent to about 30 percent, or a combination thereof.

The device 100 may comprise a photonic device. The first layer 102, the second layer 104, the third layer 106, or a combination thereof may be configured as an optical phase shifter. The first layer 102, the second layer 104, the third layer 106, or a combination thereof may be part of a component. The component may be a component of one or more of an optical network, a phased array, an optical delay line, a combination thereof, and/or the like. A logic unit (e.g., processor, microcontroller, controller, logic gate, field programmable gate array, transistor, integrated circuit) may be configured to cause an electrical potential difference to be applied between the first layer 102 and the second layer 104 to cause a tunable refractive index change in one or more of the first layer 102 or the second layer 104.

FIG. 2A is a diagram showing an optical micrograph of an example device 200. The device 200 may comprise a modulator, an optical modulator, electro-optic modulator, a Mach-Zehnder interferometers modulator, a combination thereof, and/or the like. A close-up view of a portion of the optical micrograph is shown. A patterned monolayer is shown. The example monolayer may comprise tungsten disulfide ($WS_2$) and/or transition metal di-chalcogenide materials. The patterned monolayer may comprise the first layer 102 of FIG. 1.

FIG. 2B shows a cross-sectional view of the example device 200 of FIG. 2A. The example device 200 may include one or more of the first layer 102, the second layer 104, the third layer 106, the first electrode 110, the second electrode 112, a combination thereof, and/or the like. The device 200 may comprise a fourth layer 202. The fourth layer 202 may be disposed 204 adjacent (e.g., below, in contact with) the first layer 102, the third layer 103, or a combination thereof. A side of fourth layer 202 may be in contact with both the first layer 102 and the third layer 103. The device may comprise a fifth layer 204. The fifth layer 204 may adjacent (e.g., below, in contact with) the fourth layer 202. The device 202 may comprise a waveguide 206. The waveguide 206 may be at least partially enclosed (e.g., or surrounded by) by the fifth layer 204. As an example, the waveguide 206 may comprise silicon, nitrogen, a combination thereof, and/or the like. The waveguide 206 may comprise silicon nitride ($Si_3N_4$).

As a non-limiting example, an example device 200 was fabricated according to the following materials and dimensions. The first layer 102 was made of tin disulfide, the second layer 104 was made of indium tin oxide, the third layer 106 was made of hafnium oxide, the fourth layer 202 was made of aluminum dioxide, the fifth layer 204 was made of silicon dioxide, the first electrode 110 and second electrode 112 were made of chromium/aluminum. The waveguide 206 was made of silicon nitride. The second layer 104 had a thickness of about 30 nm, the third layer 106 had a thickness of about 26 nm, the fourth layer 202 had a thickness of about 45 nm, the first electrode 110 had a thickness of about 50 nm, the second electrode 112 had a thickness of about 30 nm. The waveguide 206 had a thickness ($y_1$) of about 380 nm and width ($x_1$) of about 1000 nm. The waveguide 206 was about 150 nm below (y2) the fourth layer 404.

FIG. 2C is a diagram showing the position of the first layer 102 in the mode-profile of the waveguide configuration. A cross-section of the waveguide 206 is shown with the first layer 102 above the waveguide 206.

Figure 3C:
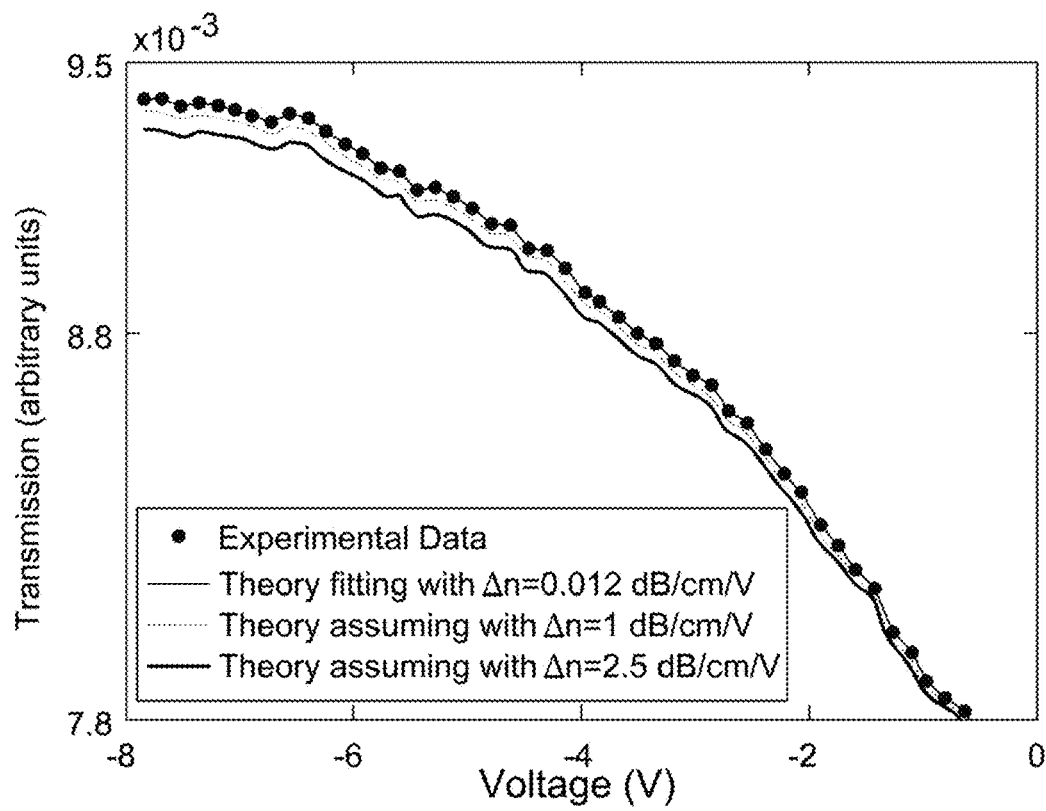
FIG. 3C is a graph showing transmission spectrum vs voltage.
Figure 3D:
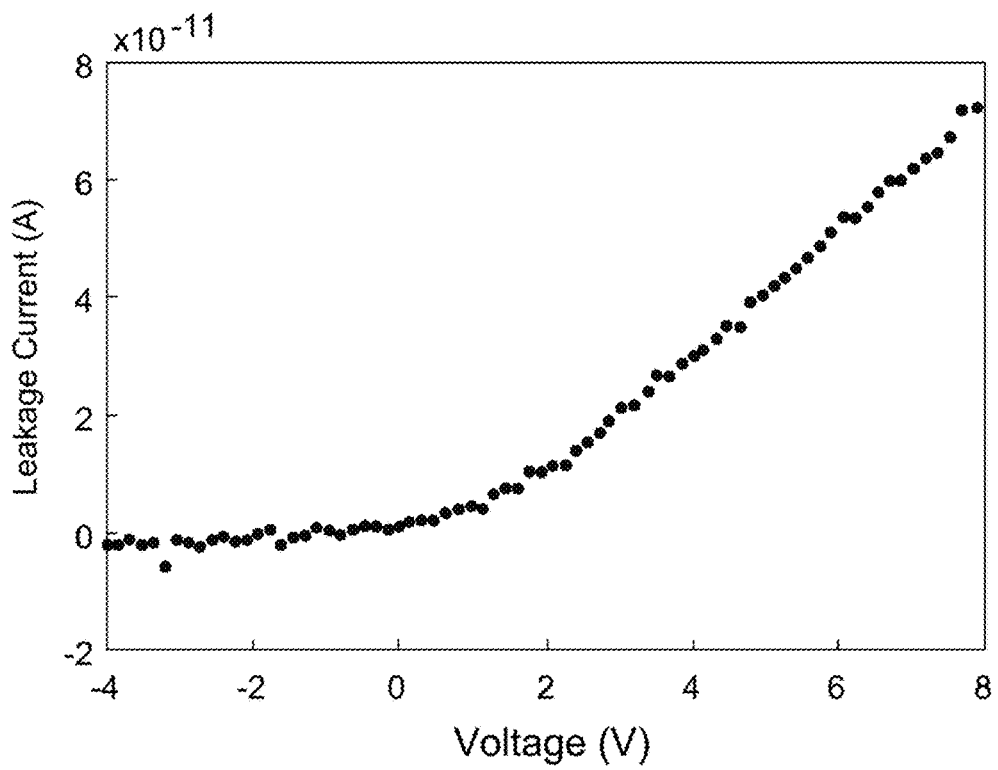
FIG. 3D is a graph showing leakage current vs voltage.

FIG. 3A through FIG. 3D are graphs showing electrical and optical measurement of the example fabricated device 200 of FIG. 2A through FIG. 2C. FIG. 3A is a graph showing transmission response of the example fabricated device 200. The graph shows MZI fringes at different voltages. FIG. 3B shows graphs illustrating change in effective index of mode and index of $WS_2$ with different voltages for 500 um and 300 um length of WS2-HfO2-ITO capacitor on one arm of MZI. FIG. 3C is a graph showing MZI Transmission spectrum vs Voltage at 1544 nm. The dotted line indicates the theoretical fit from the MZI model, considering an absorption change of <0.012 dB/cm/V and an effective index change of $7 \times 10^{-4}$. FIG. 3D is a graph showing leakage current across 26 nm of the WS2-$HfO_2$-ITO capacitor.

Figure 4:
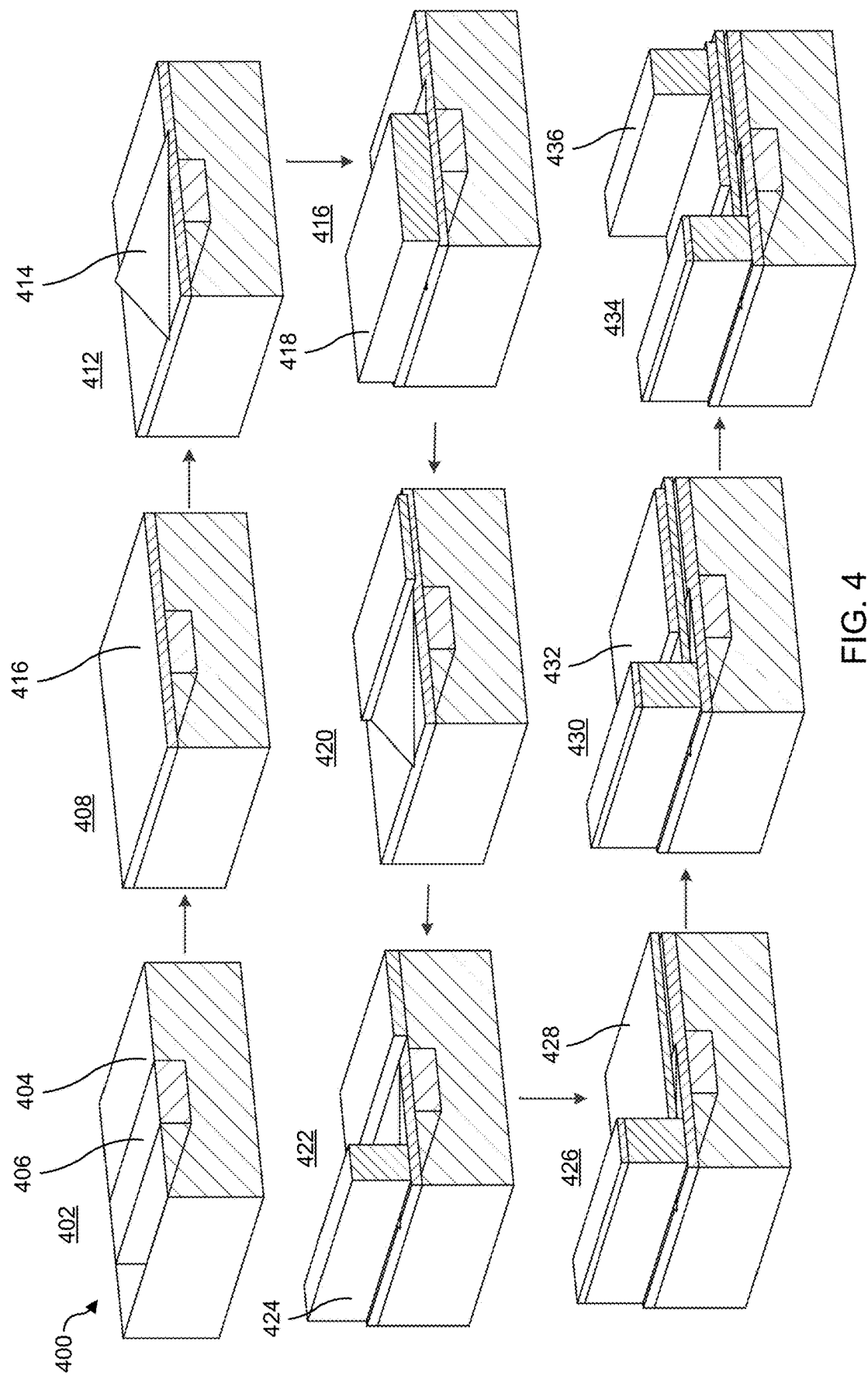
FIG. 4 is a diagram showing fabrication of an example device in accordance with the present disclosure.

FIG. 4 is a diagram showing a fabrication process of an example device in accordance with the present disclosure. In some implementations, one or more of the steps may be omitted. The example device 400 may comprise a $WS_2$ MZI modulator. At step 402, a substrate 404 (e.g., silicon dioxide) may be formed or supplied. A waveguide 406 (e.g., silicon nitride) may be disposed in the substrate 404. At step 408, a protective layer 410 may be disposed on the substrate 404, the waveguide 406, or a combination thereof. The protective layer 410 may comprise ALD Alumina (e.g., 10 nm). The protective layer 410 may be for etching using fluoroform ($CHF_3$), oxygen (e.g., $O_2$), or a combination thereof.

At step 412, a first layer 414 may be disposed on the protective layer 410. The first layer 414 may comprise the first layer 102 as described herein. The first layer 414 may comprise a monolayer. The first layer 102 may be disposed by transferring one or more flakes of a transition metal di-chalcogenide material (e.g., $MoS_2$, $WS_2$) on to the protective layer 410. The first layer 414 may be disposed adjacent to (e.g., above) the waveguide 410. The first layer 102 may comprise $MoS_2$, $WS_2$, or a combination thereof.

At step 416, a resist layer 418 may be disposed (e.g., deposited) adjacent to (e.g., on, above) a portion of the first layer 414, the protective layer 410, or a combination thereof. The resist layer 418 may comprise an Hydrogen silsesquioxane (HSQ) resist material. The resist layer 418 may disposed accord to a specific pattern. At step 420, the first layer 414 may be etched (e.g., by removing the resist layer 418). The first layer 414 may be etched by using fluoroform ($CHF_3$), oxygen (e.g., $O_2$), or a combination thereof. At step 422, a first electrode 424 may be disposed adjacent (e.g., above, on top of) at least a portion of the first layer 414. The first electrode 424 may be patterned on to the first layer 414. The first electrode 424 may comprise a metal, a metal alloy, titanium, gold, a combination thereof, and/or the like.

At step 426, a dielectric layer 428 may disposed adjacent (e.g., above, on top of) the first electrode 424, the first layer 414, the protective layer 410, or a combination thereof. The dielectric layer 428 may comprise the third layer 106 described further herein. The dielectric layer 428 may comprise hafnium oxide. The dielectric layer 428 may be disposed by a deposition process, such as atomic layer deposition. At step 430, A second layer 432 may be disposed adjacent (e.g., above, on top of) the dielectric layer 428. The second layer 432 may comprise the second layer 104 described further herein. The second layer 432 may be disposed by deposition process, such as a sputter deposition. The second layer may comprise indium tin oxide (e.g., 30 nm thick). At step 434, a second electrode 436 may be disposed adjacent (e.g., above, on top of) the second layer 432. The second electrode 436 may be disposed by a patterning process. The second electrode 436 may comprise a metal, a metal alloy, titanium, gold, a combination thereof, and/or the like.

Figure 5:
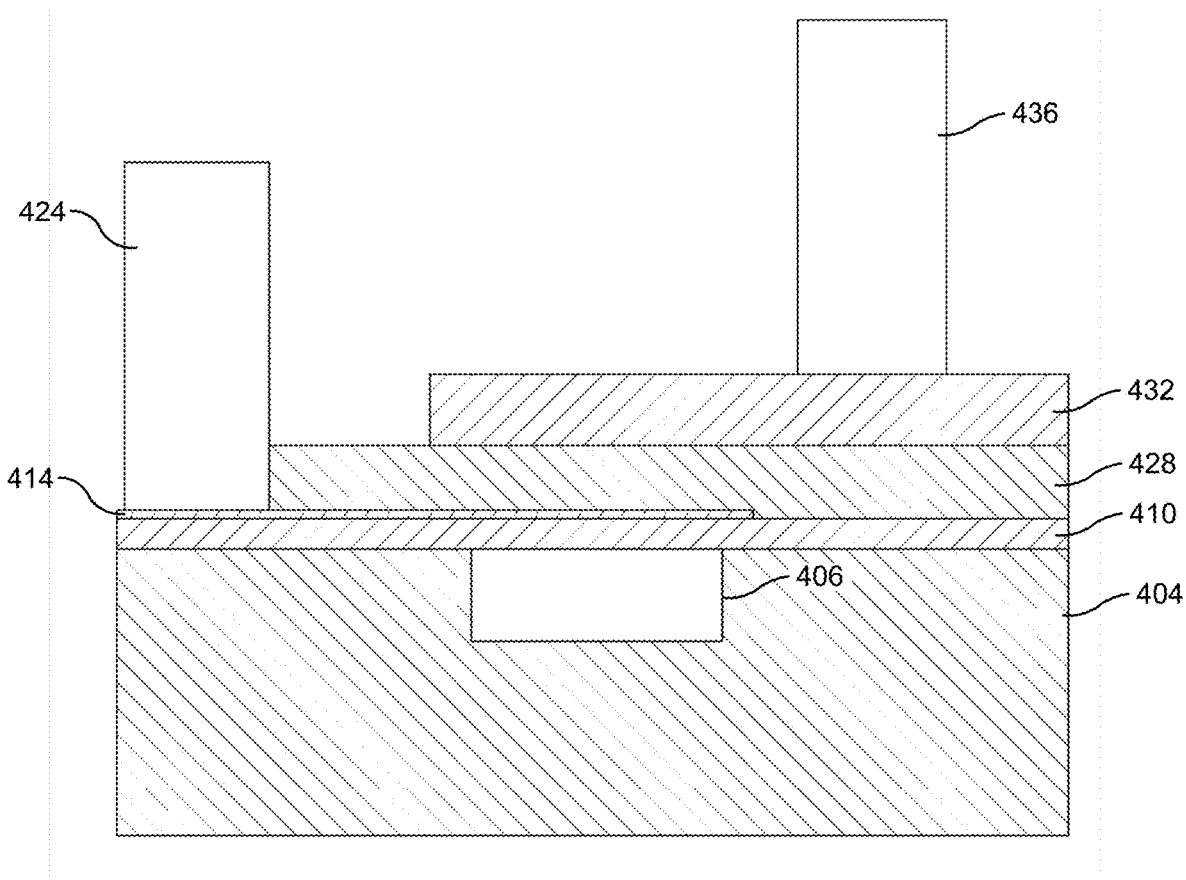
FIG. 5 is cross-sectional view of the example device shown in FIG. 4.
Figure 6:
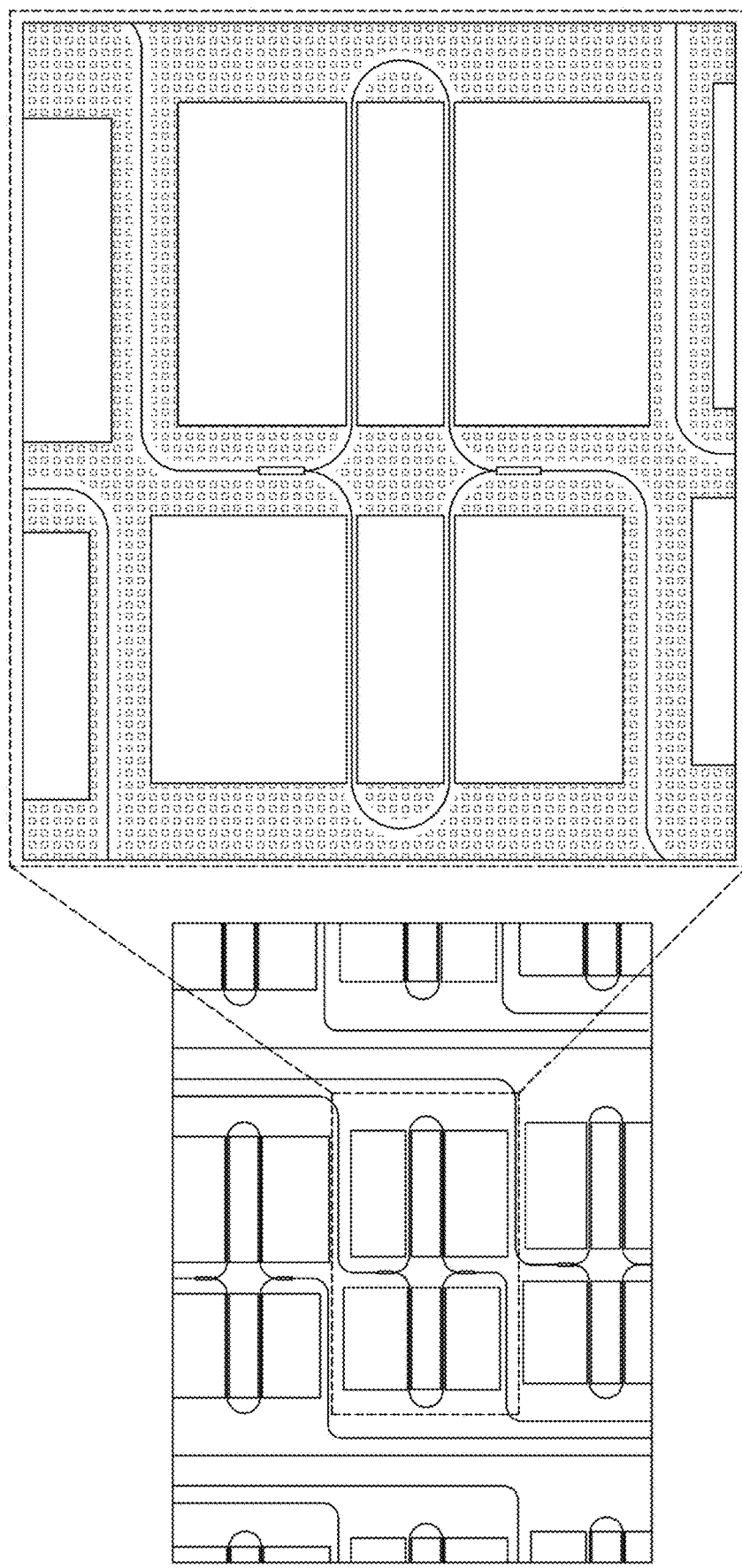
FIG. 6 is an optical micrograph of another example device fabricated according to the present disclosure.
Figure 7B:
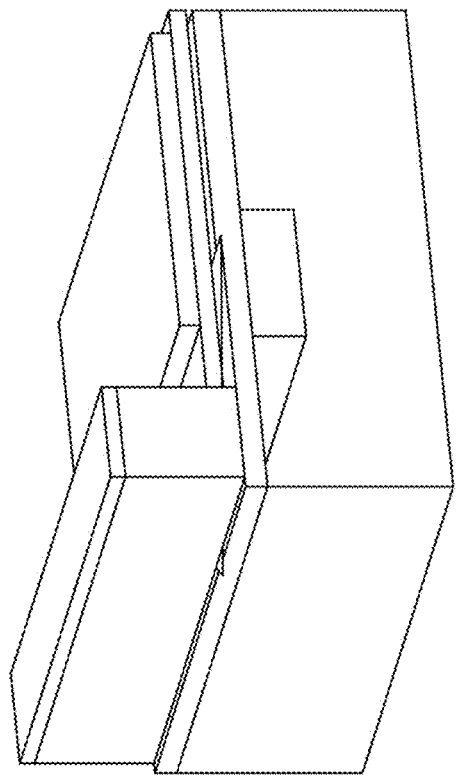
FIG. 7B is a three-dimensional cross-sectional view of a device fabricated according to the process of FIG. 4.
Figure 7A:
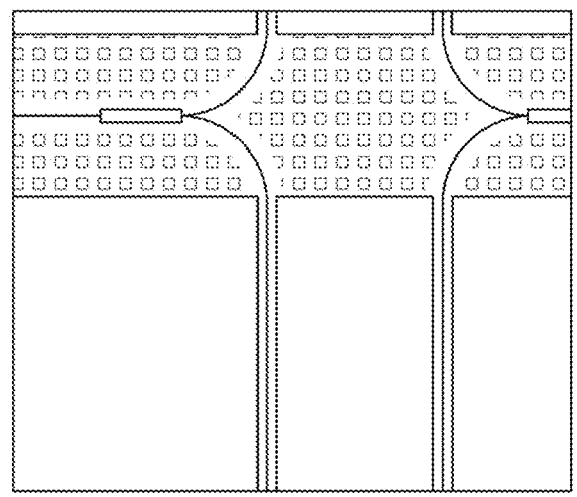
FIG. 7A is another view of the optical micrograph of FIG. 6.

FIG. 5 is cross-sectional view of the example device shown in FIG. 4. FIG. 6 is an optical micrograph of an example device fabricated according to the process shown in FIG. 4. FIG. 7A is another view of the optical micrograph of FIG. 6. FIG. 7B is a three-dimensional cross-sectional view of a device fabricated according to the process of FIG. 4.

Figure 8A:
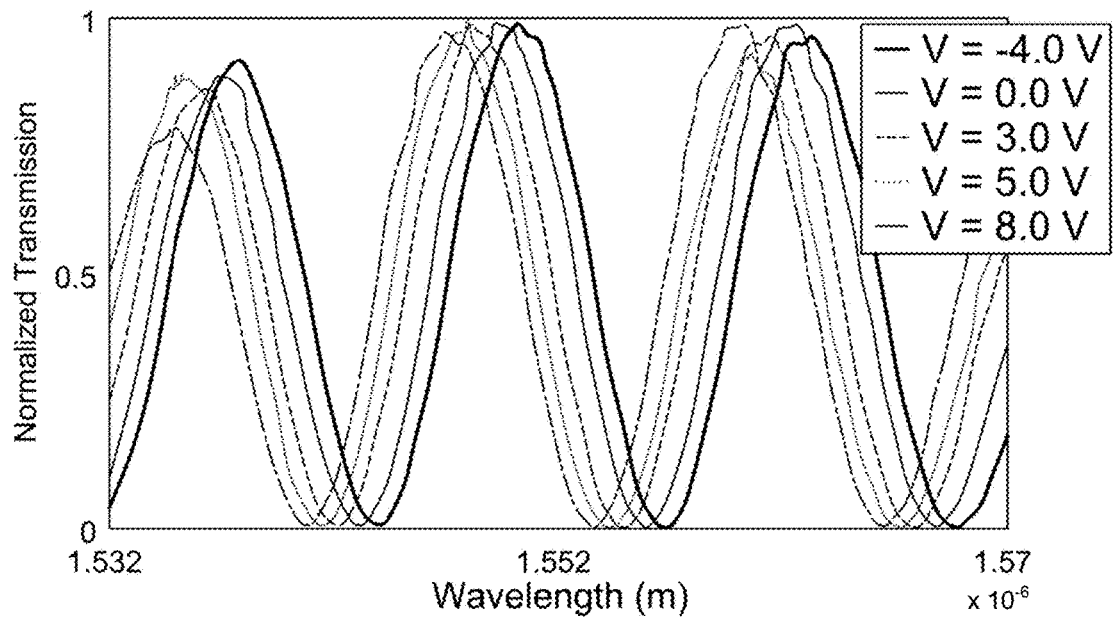
FIG. 8A is a graph of Mach-Zehnder interferometer (MZI) fringes with 500 um of $WS_2$ interaction length.
Figure 8B:
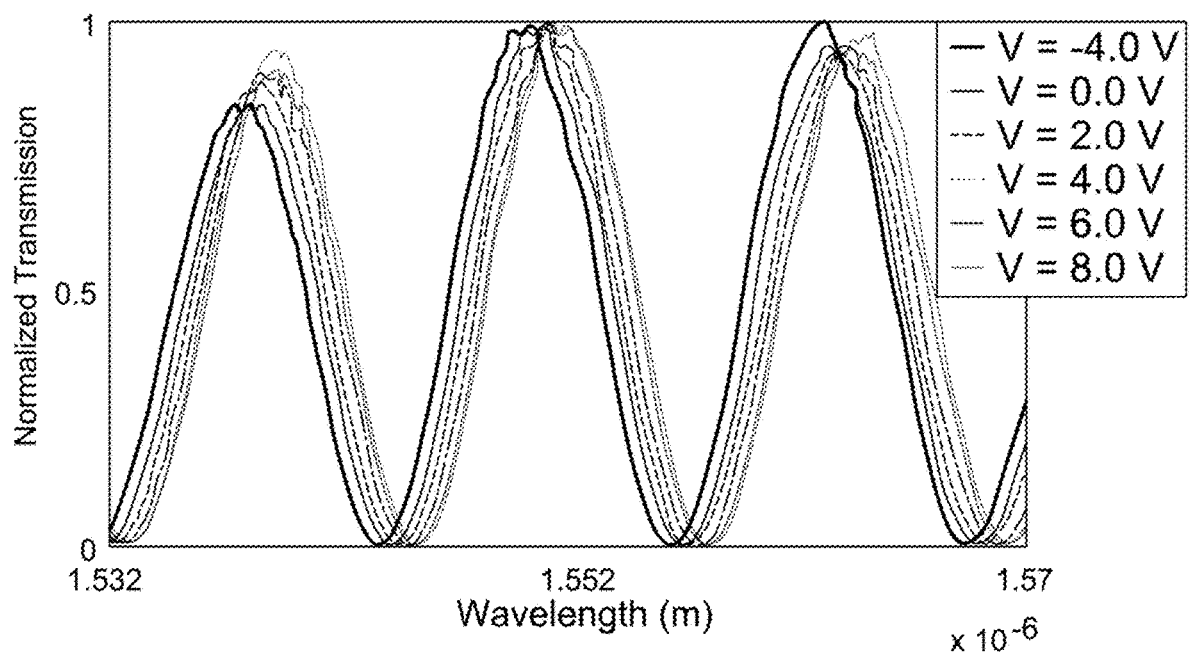
FIG. 8B is a graph of MZI interferometric fringes with 300 um of $WS_2$ interaction length.
Figure 9:
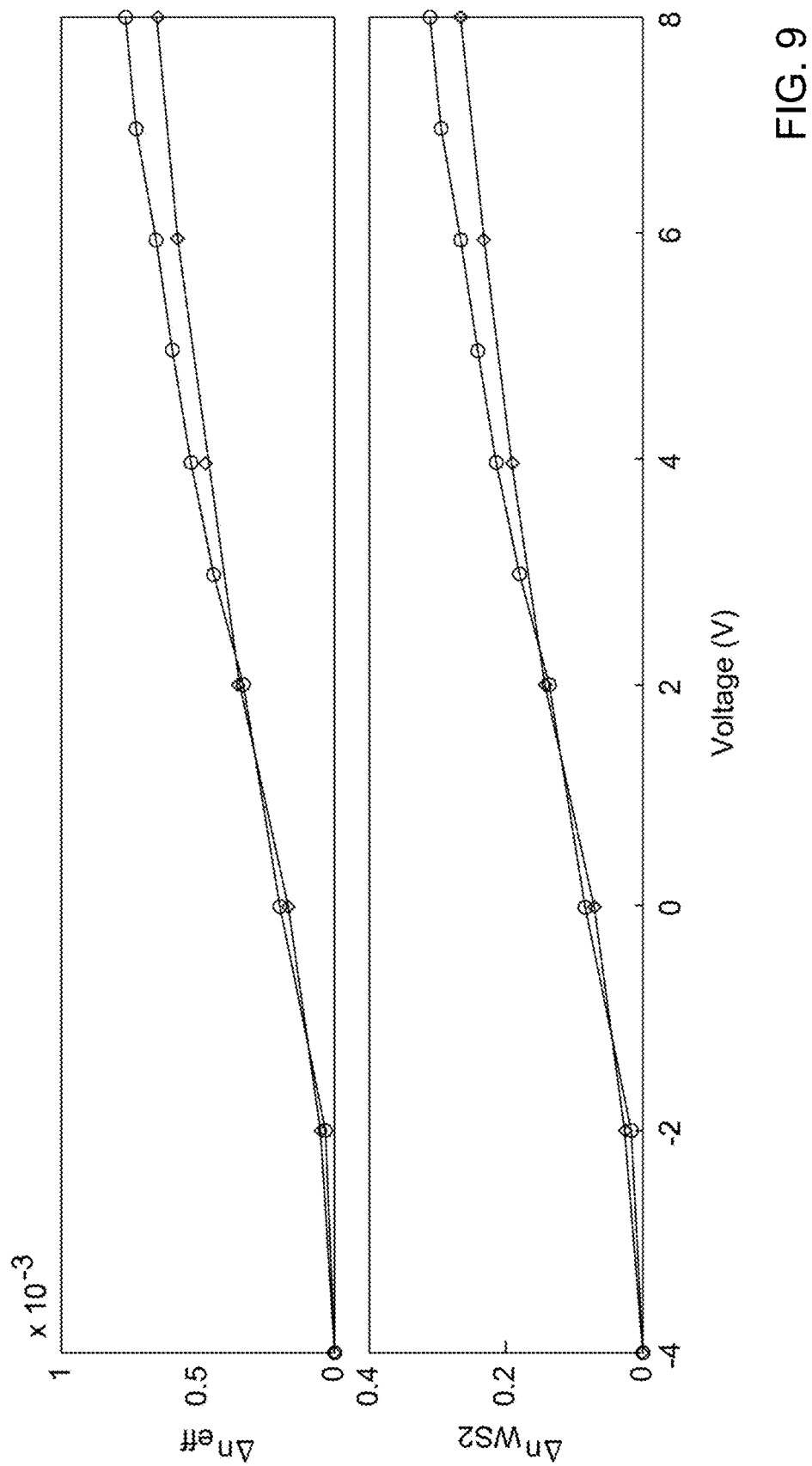
FIG. 9 shows graphs of an exemplary change in effective index of mode (top) and index of $WS_2$ (bottom) with different voltage.

FIG. 8A is a graph of MZI interferometric fringes with 500 um of $WS_2$ interaction length. FIG. 8B is a graph of MZI interferometric fringes with 300 um of $WS_2$ interaction length. FIG. 9 shows graphs of an exemplary change in effective index of mode (top) and index of $WS_2$ (bottom) with different voltage. The change in effective index of mode $\Delta n_{eff} = 7 \times 10^{-4}$; $L_\pi = 1.10$ mm; and $V_\pi L = 1.32$ V·cm. The change in index of $WS_2$ $\Delta n_{WS}2 = 0.4$; change in index of $WS_2 = 13\%$.

Figure 10A:
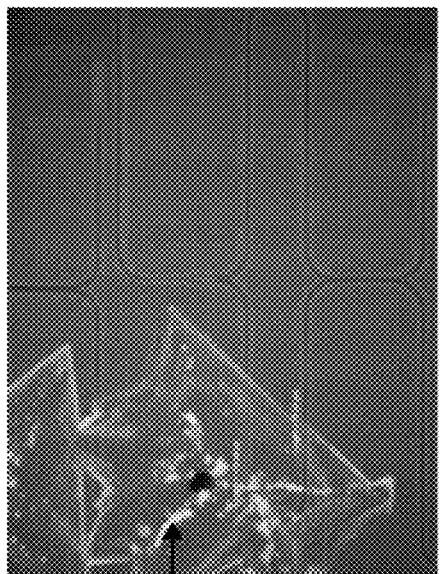
FIG. 10A shows an example multi-layer $WS_2$ sample and corresponding change in effective index.
Figure 10A:
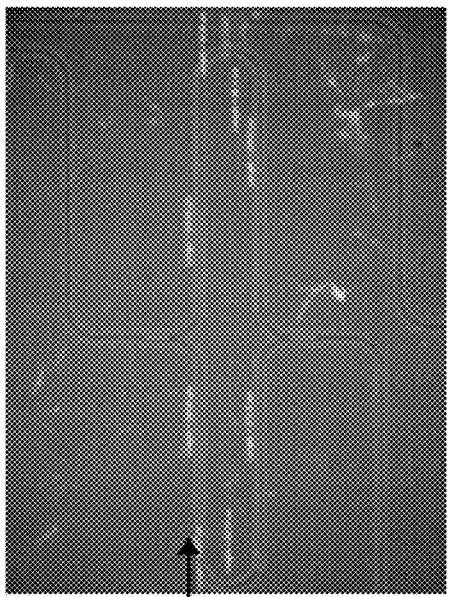
Figure 10A:
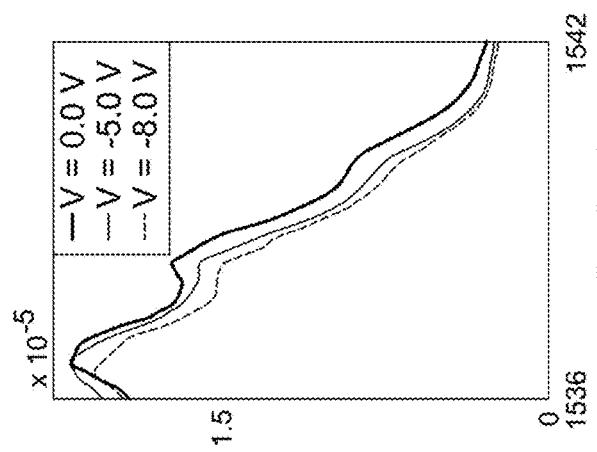
Figure 10B:
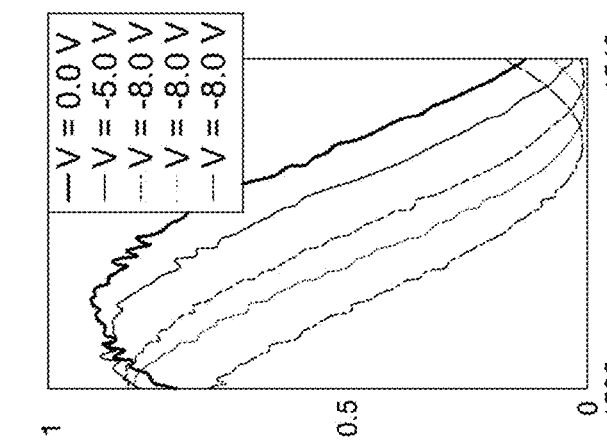
FIG. 10B shows an example monolayer $WS_2$ sample and corresponding change in effective index.

FIGS. 10A and 10B show an exemplary change in effective index in multi-layer $WS_2$ compared to an example device monolayer $WS_2$. The multi-layer device results are shown on the left, and the monolayer device results are shown on the right. The change in effective index of mode for a device comprising multi-layer $WS_2$ $\Delta n_{eff}$ (multi-layer device)=$2 \times 10^4$. The change in effective index of mode for a device comprising monolayer $WS_2$ $\Delta n_{eff}$(monolayer device) =$2 \times 10^{-7}$.

Figures 11A, 11B:
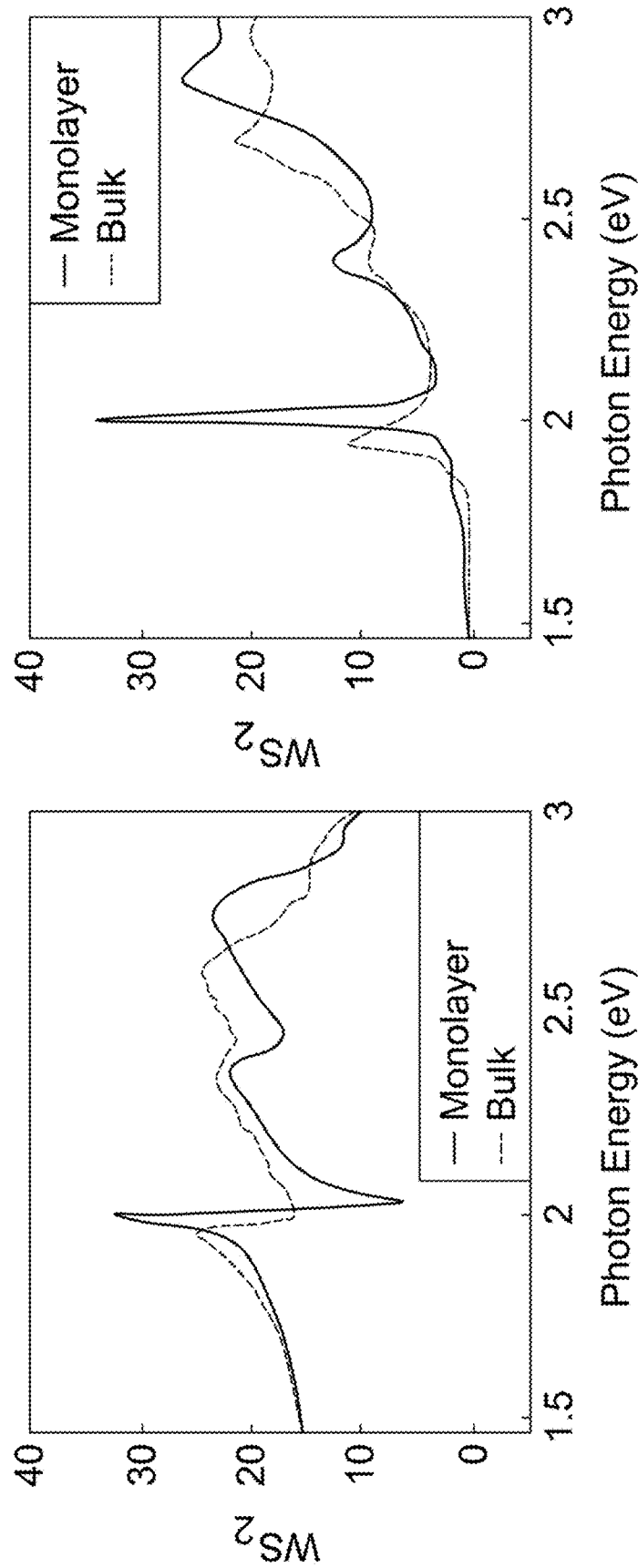
FIG. 11A is a graph showing a comparison of an exemplary increased excitation energy of monolayer $WS_2$ compared to bulk $WS_2$.
FIG. 11B is another graph showing a comparison of an exemplary increased excitation energy of monolayer $WS_2$ compared to bulk $WS_2$.
Figure 12A:
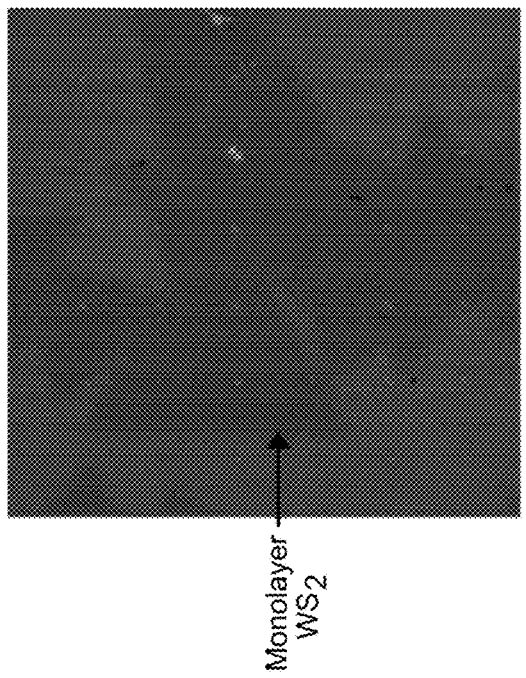
FIG. 12A shows a reflectance measurement of multi-layer $WS_2$.
Figure 12B:
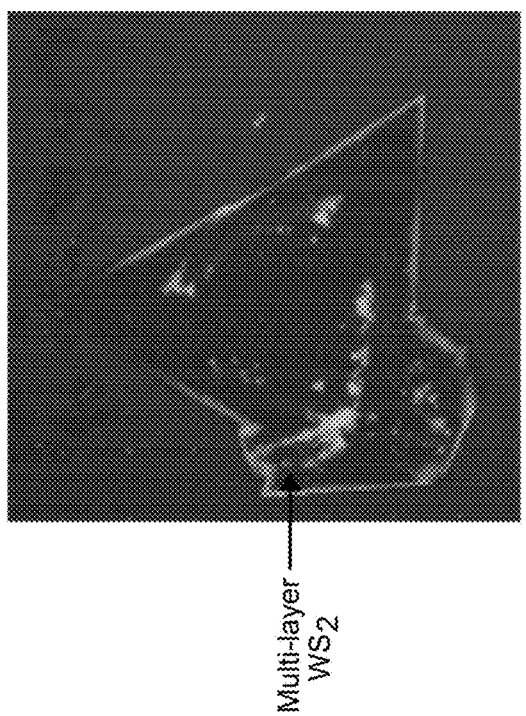
FIG. 12B shows a reflectance measurement of monolayer $WS_2$.
Figure 12C:
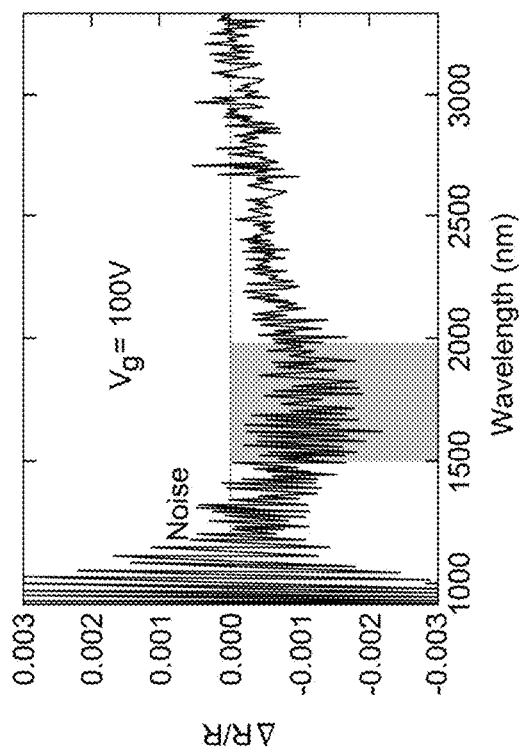
FIG. 12C shows a graph illustrating increased excitation energy of multi-layer $WS_2$ compared to monolayer $WS_2$.

FIG. 11A and FIG. 11B are graphs showing a comparison of an exemplary increased excitation energy of monolayer $WS_2$ compared to bulk $WS_2$. FIG. 12A shows a reflectance measurement of multi-layer $WS_2$. FIG. 12B shows a reflectance measurement of monolayer $WS_2$. FIG. 12C shows a graph illustrating increased excitation energy of multi-layer WS2 compared to monolayer WS2.

In various aspects, the present disclosure pertains to and includes at least the following aspects.

Aspect 1. A device comprising, consisting of, or consisting essentially of: a first layer comprising a transition metal di-chalcogenide material; a second layer comprising a conductive material; and a third layer comprising a dielectric material and disposed at least partially between the first layer and the second layer, wherein an electrical potential difference applied between the first layer and the second layer causes a tunable refractive index change in the first layer.

Aspect 2. The device of aspect 1, wherein the refractive index change caused by the electrical potential difference causes a phase shift in a near-infrared range.

Aspect 3. The device of any one of aspects 1-2, wherein the first layer, the second layer, and the third layer are configured as an optical phase shifter.

Aspect 4. The device of any one of aspects 1-3, wherein the first layer is part of a component of one or more of an optical network, a phased array, or an optical delay line.

Aspect 5. The device of any one of aspects 1-4, wherein the first layer, the second layer, and the third layer are disposed in one or more of a capacitor configuration or a parallel plate capacitor configuration.

Aspect 6. The device of any one of aspects 1-5, wherein the transition metal di-chalcogenide material comprises a two-dimensional transition metal di-chalcogenide material.

Aspect 7. The device of any one of aspects 1-6, wherein the transition metal di-chalcogenide material comprises one or more of tungsten, molybdenum, sulfur, or selenium.

Aspect 8. The device of any one of aspects 1-7, wherein the transition metal di-chalcogenide material comprises one or more of $WS_2$, $WSe_2$, $MoS_2$, or $MoSe_2$.

Aspect 9. The device of any one of aspects 1-8, wherein the third layer comprises hafnium oxide.

Aspect 10. The device of any one of aspects 1-9, wherein the conductive material comprises indium tin oxide.

Aspect 11. The device of any one of aspects 1-10, wherein the refractive index change is one or more of (i) greater than about 10 percent, (ii) in a range of about 5 percent to about 15 percent, or (iii) in a range of about 10 percent to about 15 percent.

Aspect 12. A method comprising, consisting of, or consisting essentially of: receiving a signal; and causing, based on the signal, an electrical potential difference between a first layer and a second layer to cause a tunable refractive index change in the first layer, wherein the first layer comprises a transition metal di-chalcogenide material and the second layer comprises a conductive material, wherein a third layer comprising a dielectric material is disposed at least partially between the first layer and the second layer.

Aspect 13. The method of aspect 12, wherein the refractive index change caused by the electrical potential difference causes a phase shift in a near-infrared range.

Aspect 14. The method of any one of aspects 12-13, wherein the first layer, the second layer, and the third layer are configured as an optical phase shifter.

Aspect 15. The method of any one of aspects 12-14, wherein the first layer is part of a component of one or more of an optical network, a phased array, or an optical delay line.

Aspect 16. The method of any one of aspects 12-15, wherein the first layer, the second layer, and the third layer are disposed in one or more of a capacitor configuration or a parallel plate capacitor configuration.

Aspect 17. The method of any one of aspects 12-16, wherein the transition metal di-chalcogenide material comprises a two-dimensional transition metal di-chalcogenide material.

Aspect 18. The method of any one of aspects 12-17, wherein the transition metal di-chalcogenide material comprises one or more of tungsten, molybdenum, sulfur, or selenium.

Aspect 19. The method of any one of aspects 12-18, wherein the transition metal di-chalcogenide material comprises one or more of $WS_2$, $WSe_2$, $MoS_2$, or $MoSe_2$.

Aspect 20. The method of any one of aspects 12-19, wherein the third layer comprises hafnium oxide.

Aspect 21. The method of any one of aspects 12-20, wherein the conductive material comprises indium tin oxide.

Aspect 22. The method of any one of aspects 12-21, wherein the refractive index change is one or more of (i) greater than about 10 percent, (ii) in a range of about 5 percent to about 15 percent, or (iii) in a range of about 10 percent to about 15 percent.

Aspect 23. An electro-optical device comprising, consisting of, or consisting essentially of: a component comprising a first layer and a second layer, wherein the first layer comprises a monolayer transition metal di-chalcogenide material; and a logic unit configured to cause an electrical potential difference between the first layer and the second layer to cause a tunable refractive index change in one or more of the first layer or the second layer.

Aspect 24. The device of aspect 23, wherein the refractive index change caused by the electrical potential difference causes a phase shift in a near-infrared range.

Aspect 25. The device of any one of aspects 23-24, wherein the first layer and the second layer are configured as an optical phase shifter.

Aspect 26. The device of any one of aspects 23-25, wherein the first layer is part of a component of one or more of an optical network, a phased array, or an optical delay line.

Aspect 27. The device of any one of aspects 23-26, wherein the first layer and the second layer are disposed in one or more of a capacitor configuration or a parallel plate capacitor configuration.

Aspect 28. The device of any one of aspects 23-27, wherein the transition metal di-chalcogenide material comprises a two-dimensional transition metal di-chalcogenide material.

Aspect 29. The device of any one of aspects 23-28, wherein the transition metal di-chalcogenide material comprises one or more of tungsten, molybdenum, sulfur, or selenium.

Aspect 30. The device of any one of aspects 23-29, wherein the transition metal di-chalcogenide material comprises one or more of $WS_2$, $WSe_2$, $MoS_2$, or $MoSe_2$.

Aspect 31. The device of any one of aspects 23-30, further comprising a third layer disposed at least partially between the first layer and the second layer, wherein the third layer comprises a dielectric material.

Aspect 32. The device of any one of aspects 23-31, wherein the second layer comprises a conductive material.

Aspect 33. The device of any one of aspects 23-32, wherein the refractive index change is one or more of (i) greater than about 10 percent, (ii) in a range of about 5 percent to about 15 percent, or (iii) in a range of about 10 percent to about 15 percent.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A device configured for phase modulation, the device comprising:
   a first layer comprising a monolayer transition metal di-chalcogenide material;
   a second layer comprising a conductive material;
   a third layer comprising a dielectric material and disposed at least partially between the first layer and the second layer, wherein an electrical potential difference applied between the first layer and the second layer causes a tunable refractive index change in the first layer; and
   a waveguide disposed in a substrate such that the waveguide is separated from the first layer, wherein changes in the refractive index of the first layer cause phase modulation in a near-infrared range of light in the waveguide.

2. The device of claim 1, wherein the first layer is part of a component of one or more of an optical network, a phased array, or an optical delay line.

3. The device of claim 1, wherein the first layer, the second layer, and the third layer are disposed in one or more of a capacitor configuration or a parallel plate capacitor configuration.

4. The device of claim 1, wherein the transition metal di-chalcogenide material comprises one or more of tungsten, molybdenum, sulfur, or selenium.

5. The device of claim 1, wherein the transition metal di-chalcogenide material comprises one or more of $WS_2$, $WSe_2$, $MoS_2$, or $MoSe_2$.

6. The device of claim 1, wherein the third layer comprises hafnium oxide.

7. The device of claim 1, wherein the conductive material comprises indium tin oxide.

8. The device of claim 1, wherein the refractive index change is one or more of (i) greater than about 10 percent, (ii) in a range of about 5 percent to about 15 percent, or (iii) in a range of about 10 percent to about 15 percent.

9. The device of claim 1, wherein the waveguide is separated by from the first layer by an additional layer disposed in between the substrate the first layer.

10. The device of claim 1, wherein the device is engineered to optimize modal overlap with a photonic mode.

11. The device of claim 1, wherein the substrate is planarized.

12. The device of claim 1, wherein optical absorption of the device during phase modulation is minimized to less than 0.012 dB/cm/V.

13. A method comprising:
   receiving a signal; and
   causing, based on the signal, phase modulation in the near-infrared range of light in a waveguide based on modifying an electrical potential difference between a first layer and a second layer to cause a change in a refractive index in the first layer, wherein the first layer comprises a monolayer transition metal di-chalcogenide material and the second layer comprises a conductive material, and wherein a third layer comprising a dielectric material is disposed at least partially between the first layer and the second layer, and wherein the waveguide is disposed in a substrate such that the waveguide is separated from the first layer.

14. The method of claim 13, wherein the first layer is part of a component of one or more of an optical network, a phased array, or an optical delay line.

15. The method of claim 13, wherein the first layer, the second layer, and the third layer are disposed in one or more of a capacitor configuration or a parallel plate capacitor configuration.

16. The method of claim 13, wherein the transition metal di-chalcogenide material comprises one or more of $WS_2$, $WSe_2$, $MoS_2$, or $MoSe_2$.

17. The method of claim 13, wherein the change in the refractive index is one or more of (i) greater than about 10 percent, (ii) in a range of about 5 percent to about 15 percent, or (iii) in a range of about 10 percent to about 15 percent.

18. An electro-optical device, comprising:
   a component comprising a first layer and a second layer, wherein the first layer comprises a monolayer transition metal di-chalcogenide material;
   a waveguide disposed in a substrate such that the waveguide is separated from the first layer; and
   a logic unit configured to cause phase modulation in the near-infrared range of light in the waveguide based on modifying an electrical potential difference between the first layer and the second layer to change a refractive index in one or more of the first layer or the second layer.

* * * * *